(12) United States Patent
Prakash et al.

(10) Patent No.: US 11,388,475 B2
(45) Date of Patent: *Jul. 12, 2022

(54) METHODS AND SYSTEMS FOR DYNAMIC MEDIA CONTENT OUTPUT FOR MOBILE DEVICES

(71) Applicant: Intel Corporation, Santa Clara, CA (US)

(72) Inventors: Gyan Prakash, Beaverton, OR (US); Rajesh Poornachandran, Portland, OR (US); Brian J. Hernacki, Santa Clara, CA (US); Kaitlin Murphy, Sunnyvale, CA (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,457

(22) Filed: Oct. 20, 2020

(65) Prior Publication Data

US 2021/0258636 A1 Aug. 19, 2021

Related U.S. Application Data

(63) Continuation of application No. 16/287,410, filed on Feb. 27, 2019, now Pat. No. 10,848,822, which is a (Continued)

(51) Int. Cl.
*H04J 3/18* (2006.01)
*H04N 21/4402* (2011.01)
(Continued)

(52) U.S. Cl.
CPC ..... *H04N 21/4402* (2013.01); *H04L 65/1089* (2013.01); *H04L 65/4084* (2013.01);
(Continued)

(58) Field of Classification Search
CPC ....... H04L 65/60; H04L 65/602; H04L 65/80; H04L 65/604; H04N 21/44; H04N 21/472; H04N 21/439
See application file for complete search history.

(56) References Cited

U.S. PATENT DOCUMENTS 8,786,786 B2 7/2014 Quere
9,215,483 B2 * 12/2015 Cedervall ........ H04N 21/64322
(Continued)

FOREIGN PATENT DOCUMENTS

CN 101464722 6/2009
CN 102648602 8/2012
(Continued)

OTHER PUBLICATIONS

"Pandora Internet Radio—Android Apps on Google Play", retrieved online viahttps://play.google.com/store/apps/details?id=com.pandora.android&hl=en>, on Jun. 2013, 2 pages.
(Continued)

*Primary Examiner* — Abdelnabi O Musa
(74) *Attorney, Agent, or Firm* — Schwegman Lundberg & Woessner, P.A.

(57) ABSTRACT

Embodiments of mechanisms for dynamic media content type streaming management for mobile devices are generally described herein. In some embodiments, the mobile device may receive selection input pertaining to generating output from a media file containing at least two of audio data, video data, and closed-captioning data, the selection input selecting at least one of audio, video, and closed-captioning to be output during play of the media content. In some embodiments, the mobile device may generate an audio output as a signal in response to the selection input including audio. In some embodiments, the mobile device may generate a video output as a signal in response to the selection input including video. In some embodiments, the
(Continued)

mobile device may generate a closed-captioning output as a signal in response to selection input including closed-captioning.

24 Claims, 5 Drawing Sheets

Related U.S. Application Data continuation of application No. 15/468,637, filed on Mar. 24, 2017, now Pat. No. 10,299,000, which is a continuation of application No. 15/262,779, filed on Sep. 12, 2016, now Pat. No. 10,237,611, which is a continuation of application No. 13/631,946, filed on Sep. 29, 2012, now Pat. No. 9,444,862.

(51) Int. Cl.

| | | |
|---|---|---|
| H04L 65/60 | (2022.01) | |
| H04L 65/613 | (2022.01) | |
| H04L 65/612 | (2022.01) | |
| H04L 65/80 | (2022.01) | |
| H04N 21/2343 | (2011.01) | |
| H04N 21/432 | (2011.01) | |
| H04N 21/434 | (2011.01) | |
| H04N 21/439 | (2011.01) | |
| H04N 21/44 | (2011.01) | |
| H04N 21/488 | (2011.01) | |
| H04L 65/1089 | (2022.01) | |
| H04N 21/235 | (2011.01) | |
| H04N 21/414 | (2011.01) | |
| H04N 21/41 | (2011.01) | |
| H04N 21/436 | (2011.01) | |
| H04N 21/472 | (2011.01) | |
| H04N 21/61 | (2011.01) | |
| H04W 84/04 | (2009.01) | |

(52) U.S. Cl.
CPC .......... *H04L 65/4092* (2013.01); *H04L 65/60* (2013.01); *H04L 65/602* (2013.01); *H04L 65/604* (2013.01); *H04L 65/80* (2013.01); *H04N 21/2351* (2013.01); *H04N 21/23439* (2013.01); *H04N 21/4126* (2013.01); *H04N 21/41407* (2013.01); *H04N 21/434* (2013.01); *H04N 21/439* (2013.01); *H04N 21/4325* (2013.01); *H04N 21/43615* (2013.01); *H04N 21/44* (2013.01); *H04N 21/472* (2013.01); *H04N 21/4884* (2013.01); *H04N 21/6125* (2013.01); *H04N 21/6131* (2013.01); *H04W 84/042* (2013.01)

(56) References Cited

U.S. PATENT DOCUMENTS

| | | | | |
|---|---|---|---|---|
| 9,215,512 | B2* | 12/2015 | Cohen | H04N 21/8355 |
| 9,444,862 | B2 | 9/2016 | Prakash et al. | |
| 2005/0175108 | A1 | 8/2005 | Wo | |
| 2005/0191028 | A1* | 9/2005 | Matsuda | H04N 21/4348 |
| | | | | 386/277 |
| 2005/0262254 | A1 | 11/2005 | Sherwani | |
| 2007/0110012 | A1* | 5/2007 | Abu-Amara | H04L 43/0876 |
| | | | | 370/338 |
| 2007/0297602 | A1 | 12/2007 | Hull et al. | |
| 2008/0077965 | A1 | 3/2008 | Kamimaki et al. | |
| 2008/0089665 | A1 | 4/2008 | Thambiratnam et al. | |
| 2009/0231489 | A1 | 9/2009 | Yabuta et al. | |
| 2010/0205049 | A1* | 8/2010 | Long | G06Q 30/0252 |
| | | | | 705/14.5 |
| 2010/0325193 | A1* | 12/2010 | Baldwin | H04L 65/80 |
| | | | | 709/203 |
| 2011/0106963 | A1 | 5/2011 | Lee et al. | |
| 2011/0111808 | A1 | 5/2011 | Fields et al. | |
| 2011/0138069 | A1 | 6/2011 | Momchilov et al. | |
| 2011/0314485 | A1 | 12/2011 | Abed | |
| 2012/0072538 | A1 | 3/2012 | Ma et al. | |
| 2014/0006538 | A1 | 1/2014 | Oikonomou | |
| 2014/0095664 | A1 | 4/2014 | Prakash et al. | |
| 2014/0250230 | A1 | 9/2014 | Brueck et al. | |
| 2017/0150199 | A1 | 5/2017 | Prakash | |

FOREIGN PATENT DOCUMENTS

| | | |
|---|---|---|
| CN | 104584676 | 4/2015 |
| EP | 1965564 | 9/2008 |
| EP | 2901806 | 8/2015 |
| JP | 2005252375 | 9/2005 |
| JP | 2005323173 | 11/2005 |
| JP | 2006284148 | 10/2006 |
| JP | 2007267335 | 10/2007 |
| JP | 2008085515 | 4/2008 |
| JP | 2008187691 | 8/2008 |
| JP | 2008252375 | 10/2008 |
| JP | 2008282295 | 11/2008 |
| JP | 2016500941 | 1/2016 |
| WO | 2001056297 | 8/2001 |
| WO | 2007024451 | 3/2007 |
| WO | 2007095562 | 8/2007 |
| WO | 2011029039 | 3/2011 |
| WO | 2012066748 | 5/2012 |
| WO | 2012100197 | 7/2012 |
| WO | 2014052871 | 4/2014 |

OTHER PUBLICATIONS

"Rovi Multi-Screen Service: Product Details", Rovi, retrieved online via http://www.rovicorp.com/webdocuments/product_literature/rovi-multi-screen-service-product-details.pdf?link_id=>, 2013, 2 pages.
"Workplace Confidential: What Kind of Videos Do Americans Admit to Watching on Their Mobile Devices at Work?", Harris Interactive Poll, retrieved online via http://www.tubefilter.com/wp-content/uploads/2011/10/wistia-what-americans-watching.jpg>, 2011.
Communication pursuant to Rule 69 EPC in European Patent Application No. 17171625.1, dated Mar. 19, 2018.
Corrected Notice of Allowance for U.S. Appl. No. 16/287,410, dated Sep. 29, 2020.
Corrected Notice of Allowance for U.S. Appl. No. 13/631,946, dated Apr. 22, 2016, 5 pages.
Corrected Notice of Allowance for U.S. Appl. No. 13/631,946, dated Aug. 10, 2016, 13 pages.
Corrected Notice of Allowance for U.S. Appl. No. 13/631,946, dated Jul. 14, 2016, 3 pages.
Corrected Notice of Allowance for U.S. Appl. No. 13/631,946, dated May 31, 2016, 2 pages.
Decision to Grant dated Feb. 15, 2018 in Japanese Patent Application No. 2017-076803.
Decision to Grant dated May 15, 2018 in Japanese Patent Application No. 2017-039032.
Decision to Grant dated Jan. 31, 2017 in Japanese Patent Application No. 2015-534763.
Extended European Search Report dated Feb. 12, 2018 in European Patent Application No. 17171625.1, and related attachments.
Extended European Search Report dated May 12, 2017 in European Patent Application No. 17163122.9, and related attachments.
Extended European Search Report for European Patent Application No. 13842543.4, dated Apr. 25, 2016.
Final Office Action for U.S. Appl. No. 16/287,410, dated Jun. 8, 2020.
Final Office Action for U.S. Appl. No. 13/631,946, dated Nov. 5, 2015, 24 pages.
International Preliminary Report on Patentability for PCT Application No. PCT/US2013/062367, dated Apr. 9, 2015, 7 pages.

(56) References Cited

OTHER PUBLICATIONS

International Search Report and Written Opinion for PCT Application No. PCT/US2013/062367, dated Oct. 31, 2013.
Non-Final Office Action for U.S. Appl. No. 13/631,946, dated Apr. 30, 2015, 24 pages.
Notice of Allowance for U.S. Appl. No. 13/631,946, dated Apr. 5, 2016, 18 pages.
Notice of Allowance for U.S. Appl. No. 15/262,779, dated Oct. 30, 2018.
Notice of Allowance for U.S. Appl. No. 15/468,637, dated Dec. 4, 2018.
Notice of Allowance for U.S. Appl. No. 16/287,410, dated Aug. 12, 2020.
Notice of Grant of Patent Right for Invention and Notice on Proceeding with the Registration Formalities dated Nov. 5, 2018 in Chinese Patent Application No. 201380045188.5, and partial summarized English translation.
Notification to Grant Patent Right and partial summarized English translation for Chinese Patent Application No. 201710207473.2, dated May 30, 2019.
Notification to Grant Patent Right and partial summarized translation for Chinese Patent Application No. 201710245475.0, dated Aug. 16, 2019.
Office Action and English Translation for Japanese Patent Application No. 2015-534763, dated May 31, 2016.
Office Action and related attachments for European Patent Application No. 13842543.4, dated Aug. 20, 2019.
Office Action and related attachments for European Patent Application No. 17163122.9, dated May 29, 2019.
Office Action and related attachments for European Patent Application No. 17171625.1, dated Mar. 19, 2018.
Office Action and related attachments for European Patent Application No. 17171625.1, dated Mar. 3, 2020.
Office Action and related attachments for U.S. Appl. No. 15/262,779, dated Dec. 29, 2017.
Office Action and related attachments for U.S. Appl. No. 15/262,779, dated Aug. 16, 2018.
Office Action and related attachments for U.S. Appl. No. 15/468,637, dated May 16, 2018.
Office Action dated Jan. 16, 2018 in Japanese Patent Application No. 2017-039032, and partial summarized English translation.
Office Action dated Aug. 2, 2017 in Chinese Patent Application No. 201380045188.5, related search report, and partial summarized English translations thereof.
Office Action dated Dec. 26, 2018 in Chinese Patent Application No. 201710207473.2.
Office Action dated Dec. 5, 2017 in European Patent Application No. 13842543.4, and related attachments.
Office Action dated Apr. 8, 2018 in Chinese Patent Application No. 201380045188.5, related attachments, and partial summarized English translation.
Office Action for Chinese Patent Application No. 201380045188.5, dated Jul. 25, 2018.
Office Action for Chinese Patent Application No. 201710245475.0, dated Apr. 2, 2019.
Office Action for Korean Patent Application No. 2015-7004561, dated Feb. 5, 2016.
Office Action for Korean Patent Application No. 2015-7004561, dated Oct. 30, 2015.
Office Action for U.S. Appl. No. 16/287,410 dated Jan. 8, 2020.
Office Action for U.S. Appl. No. 15/468,637 and related attachments, dated Oct. 2, 2018.
Partial summarized English translation of Office Action dated Jul. 25, 2018 in Chinese Patent Application No. 201380045188.5.
Communication pursuant to Article 94(3) EPC for European Patent Application No. 13842543.4, dated May 12, 2021.
Communication pursuant to Article 94(3) for European Patent Application No. 17171625.1, dated Aug. 20, 2021.

* cited by examiner

METHODS AND SYSTEMS FOR DYNAMIC MEDIA CONTENT OUTPUT FOR MOBILE DEVICES

PRIORITY APPLICATION

This application is a continuation of U.S. application Ser. No. 13/631,946, filed Sep. 29, 2012, which is incorporated herein by reference in its entirety.

TECHNICAL FIELD

Embodiments pertain to mobile devices. Some embodiments relate to dynamic media content output for mobile devices.

BACKGROUND

In the last several years, media consumption on mobile devices has grown rapidly. The increase of downloading or streaming media content over mobile networks onto mobile devices is a major concern for both mobile network operators and mobile device users because of the increased bandwidth required to transmit the media content. The bandwidth burden on mobile networks is a major reason why most mobile network operators do not offer unlimited data usage plans.

There are some negative consequences to the increase of users downloading or streaming media content via mobile networks onto their mobile devices. As downloading or streaming of media content over a mobile network increases, the bandwidth burden on mobile networks increases, thereby increasing infrastructure costs and reducing a mobile network operator's ability to provide consistently high-speed service across its user base. Furthermore, if a user is not on an unlimited data plan, the increase in downloading or streaming of media content over the mobile network by the user consumes greater amounts of the user's data usage quota.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some scenarios, a user of a mobile device may want to download or stream some media content that may contain multiple output modes, such as audio and video, but is only interested in one of the output modes (e.g. audio). Downloading or streaming media content that includes undesired output modes unnecessarily consumes bandwidth, user data quota, battery power on the user's mobile device (e.g., mobile phone, smartphone, tablet, or other device that receives data via a wireless network connection), and the user's time. Although some existing approaches allow users to turn off an output mode, e.g. muting a video that also contains audio content, the mobile device nonetheless continues to receive the stream(s) of data for the other output modes. Adapting the media content to contain only the desired output mode(s), such as on a server prior to transmission of media content over a network to the mobile device, so that only the data pertaining to the desired output mode(s) is streamed to the mobile device addresses some shortcomings in some current content streaming systems.

In some scenarios, a user of a mobile device may want to playback some media content already on the user's mobile device. The media content may contain multiple output modes, such as audio and video, but the user is only interested in one of the output modes (e.g. audio.) Playback that includes the undesired output modes unnecessarily consumes battery power on the user's mobile device. Adapting media content so that a mobile device renders only the desired output mode(s) addresses some shortcomings in some current content playback mechanisms.

Figure 1:
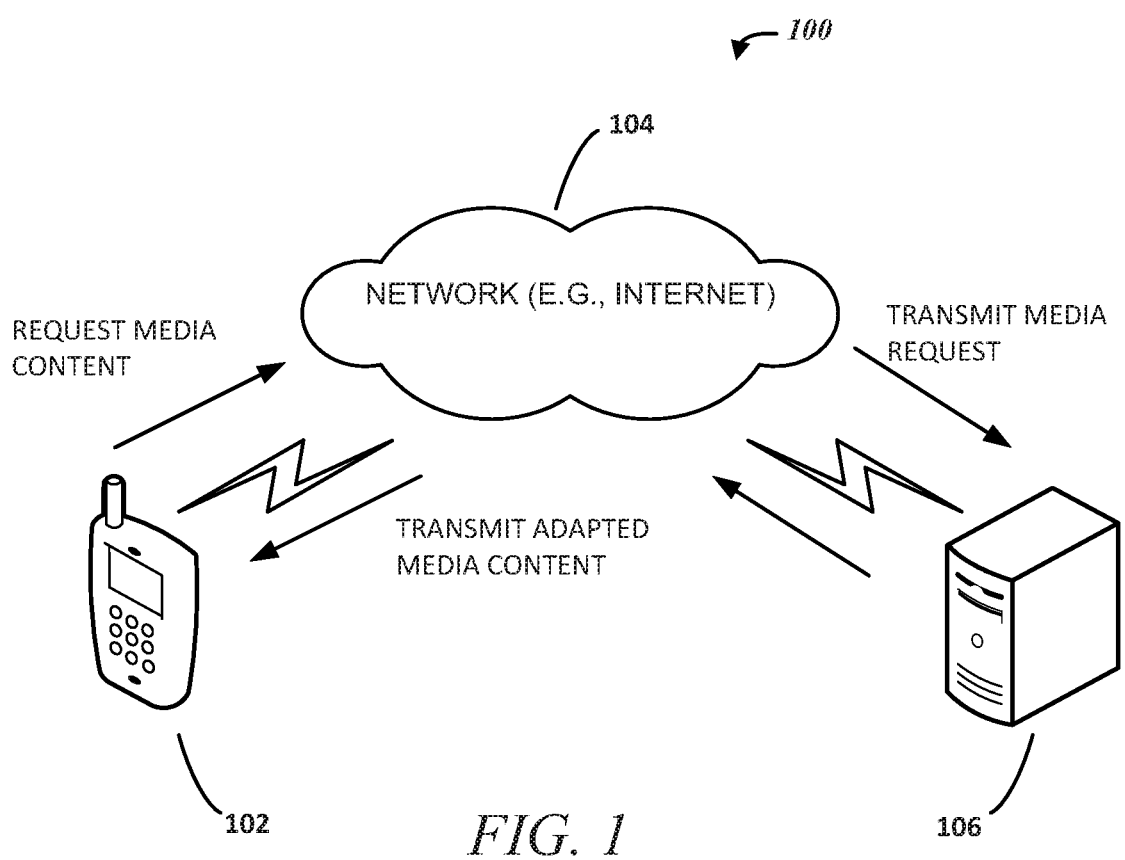
FIG. 1 illustrates an operational environment of a system for dynamic media content output in accordance with some embodiments.

FIG. 1 illustrates an operational environment of a system for dynamic media content output in accordance with some embodiments. In some embodiments, mobile device 102 may request media content from media content provider 106 via a network 104. In some embodiments, "media content" may constitute a single file, while in other embodiments "media content" may constitute a plurality of files. The request for media content may be transmitted to a media content provider 106 via a network 104, such as the internet. In some embodiments, network 104 may be a wireless mobile network. In some embodiments, network 104 may be a combination of networks, which may include both wired and wireless networks. In some embodiments, media content provider 106 may not store the requested media content; in such embodiments, media content provider 106 may retrieve the requested media content from another source.

In some embodiments, mobile device 102 may receive selection input pertaining to generating output from media content containing at least two of audio data, video data, and closed-captioning data. For example, a user may select particular media content that contains audio, video, and closed-captioning. The selection input may select not only the desired content, but also select at least one of audio, video, and closed-captioning to be output during play of the media content. For example, the user may input a selection to receive only video and closed-captioning from media content that contains audio, video, and closed-captioning. In some embodiments, the mobile device 102 transmits the selection along with the request for media content to the media content provider 106 via a network 104.

Upon the media content provider 106 receiving the request for media content, which may include the selection input, sent by the mobile device 102, the media content provider 106 may adapt the media content, in accordance with some embodiments. In some embodiments, when the request for media content includes selection input, the media content provider 106 may adapt the media content in accordance with the selections in the selection input. For example, if the selection input selected only audio, media content provider 106 may adapt the requested media content, which may contain audio data and video data, to contain only audio data. In some example embodiments, this may entail the media content provider 106 deleting the video and closed-captioning associated with the audio before transmitting the audio content to the mobile device 102.

After adapting the requested media content, media content provider 106 may transmit the adapted media content to mobile device 102 via network 104. In some embodiments, the transmission may be a standard transmission (i.e. download) of the entire adapted media content. Such transmissions may be performed if the adapted media content is intended for playback after the entire adapted media content has been downloaded. In other embodiments, the transmission may be a streaming transmission, which allows the mobile device 102 to play the adapted media content as it is being received.

In some embodiments, media content provider 106 may synchronously adapt a portion of the media content and transmit the adapted portion to mobile device 102, rather than adapting the entire media content before starting transmission. In some embodiments, media content provider 106 may encrypt a part of or all of the adapted media content to mobile device 102. The encryption mechanism used may be either public-key encryption or private-key encryption. The encryption mechanism may be part of a digital rights management system used to prevent unauthorized playback or copying of the media content. The encryption may be performed according to one of several encryption algorithms such as the RSA algorithm, MD5, Advanced Encryption Standard (AES), and other encryption algorithms.

In some embodiments, if the request for media content did not include selection input, media content provider 106 may adapt the media content according to a policy. The policy may be stored by media content provider 106, in accordance with some embodiments. In some embodiments, the policy may be specific to at least one intended recipient of the adapted media content. In some embodiments, the policy may be a default policy that is utilized for all media content requests when selection input has not been received.

In some embodiments, the media content provider may adapt the media content based partially on the data throughput available to the intended recipient of the adapted media content. "Data throughput" is defined as the average rate of successful message delivery over a communication channel. Adapting the media content based partially on the data throughput available to the intended recipient of the adapted media content may include down sampling of content, such as audio and video content.

In some embodiments, the policy may contain output mode settings for streaming events within the media content that are of interest for the user. For example, a user may want to receive only the audio data corresponding to a football game, but may want to receive both audio and video if a touchdown or interception occurs. In some embodiments, the media content provider maintains the synchronization of the constituent components of the media content, so that the media content provider may combine and send the appropriate portions of the media content.

In some embodiments, the policy may contain default output mode settings for particular types of media content. For example, a user may specify that sporting events should default to being streamed in audio mode only. In some embodiments, the selection input received by the user's mobile device is used to store the policy settings.

Figure 2:
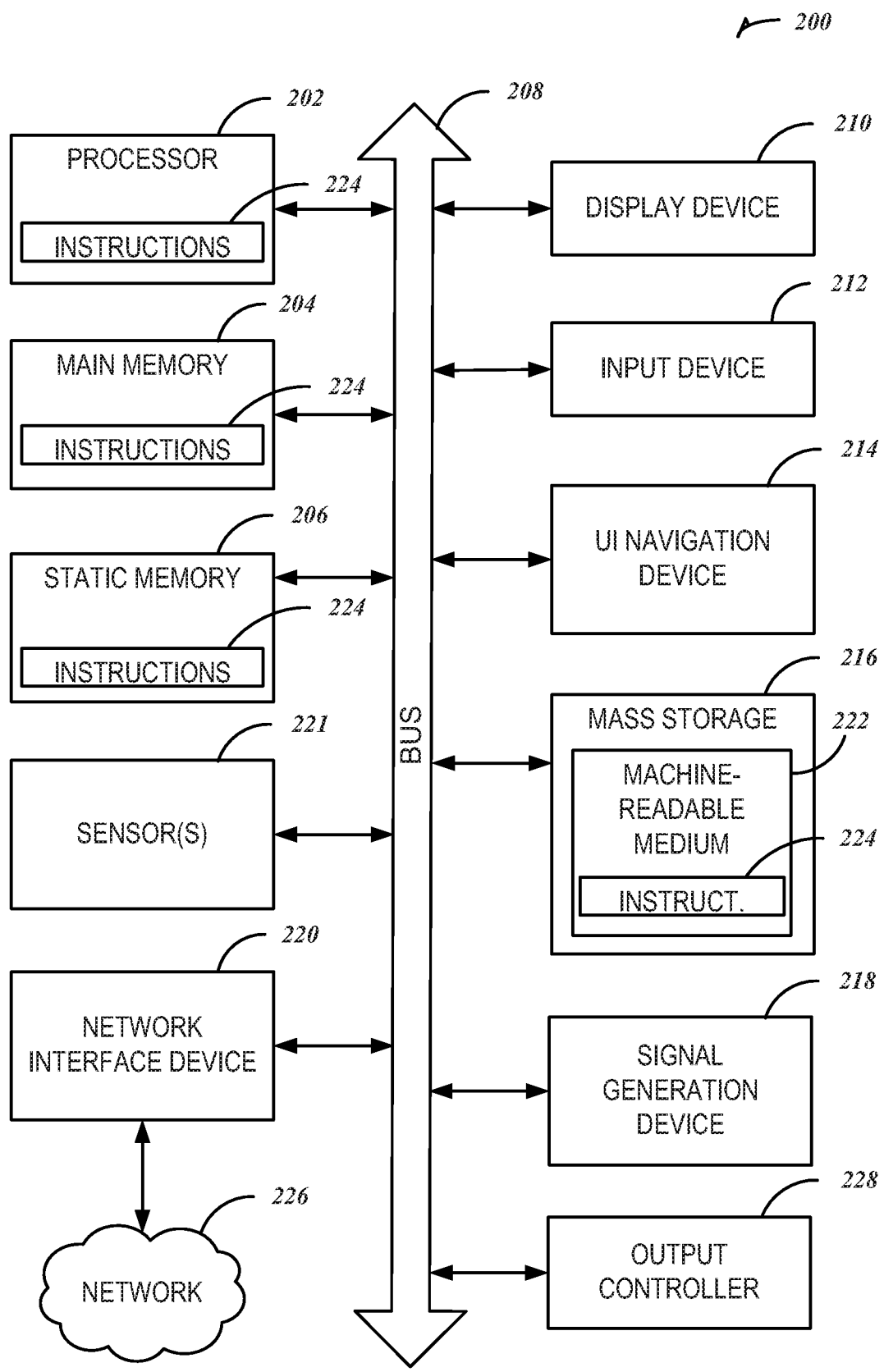
FIG. 2 illustrates a functional block diagram of an example machine in accordance with some embodiments.

FIG. 2 illustrates a block diagram of an example machine 200 upon which any one or more of the techniques (e.g., methodologies) discussed herein can perform. In alternative embodiments, the machine 200 can operate as a standalone device or can be connected (e.g., networked) to other machines. In a networked deployment, the machine 200 can operate in the capacity of a server machine, a client machine, or both in server-client network environments. In an example, the machine 200 can act as a peer machine in peer-to-peer (P2P) (or other distributed) network environment. The machine 200 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster policies.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software may reside on a non-transitory machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 200 can include a hardware processor 202 (e.g., a central processing unit (CPU), a graphics processing unit (GPU), a hardware processor core, or any combination thereof), a main memory 204 and a static memory 206, some or all of which can communicate with each other via a bus 208. The machine 200 can further include a display unit 210, an alphanumeric input device 212 (e.g., a keyboard), and a user interface (UI) navigation device 214 (e.g., a mouse). In an example, the display unit 210, input device 212 and UI navigation device 214 can be a touch screen display. The machine 200 can additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 can include an output controller 228, such as a serial (e.g., universal serial bus (USB), parallel, or other wired or wireless (e.g., infrared (IR)) connection to communicate or control one or more peripheral devices (e.g., a printer, card reader, etc.)

The storage device 216 can include a machine-readable medium 222 on which is stored one or more sets of data structures or instructions 224 (e.g., software) embodying or utilized by any one or more of the techniques or functions described herein. The instructions 224 can also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 can constitute machine-readable media.

While the machine-readable medium 222 is illustrated as a single medium, the term "machine-readable medium" can include a single medium or multiple media (e.g., a centralized or distributed database, and/or associated caches and servers) that configured to store the one or more instructions 224.

The term "machine-readable medium" can include any tangible medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 224 can further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 220 can include one or more physical jacks (e.g., Ethernet, coaxial, or phone jacks) or one or more antennas to connect to the communications network 226. In an example, the network interface device 220 can include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
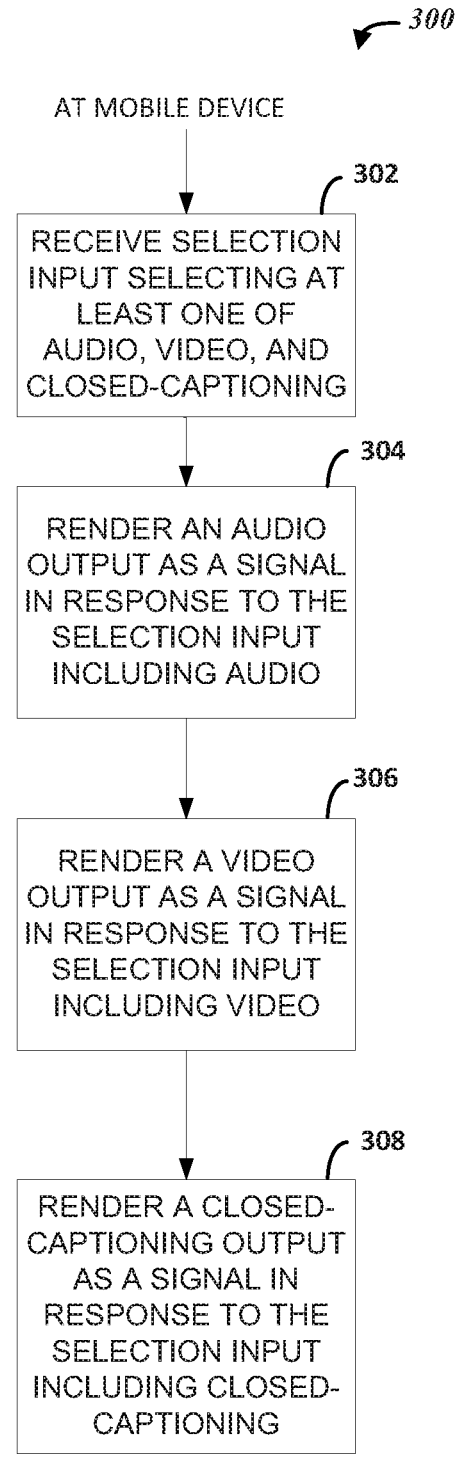
FIG. 3 illustrates a method of dynamic media content output on a mobile device in accordance with some embodiments.

FIG. 3 illustrates a method of dynamic media content output 300 on a mobile device 102 in accordance with some embodiments. In some embodiments, a user of a mobile device 102 may already have multi-mode (e.g. audio and video) media content on the user's mobile device 102. In other embodiments, a user of a mobile device 102 may request media content from a media content provider 106 via a network 104.

In some embodiments, mobile device 102 may receive selection input 302, the selection input selecting for playback at least one of audio, video, and closed-captioning from media content containing at least two of audio, video, and closed-captioning. The selection input may be received by mobile device 102 by way of a user touching a touch screen of the mobile device 102, one or more buttons of the mobile device 102, by voice command from the user to the mobile device 102, or by a gesture from the user to the mobile device 102, in accordance with some embodiments. In some embodiments, the selection input may be determined by the mobile device 102 from its context, without user involvement. For example, while the mobile device 102 is playing media content containing both audio and video data, the mobile device 102 may determine that it has been placed into a pocket or a purse, in which case the mobile device 102 may switch from audio and video playback to audio playback only.

In some embodiments, if the mobile device 102 already has the media content intended for playback, mobile device 102 might generate 304 in response to the selection input including audio, an audio output as a signal, the signal corresponding to audio data stored in the media content, from which auditory waves can be generated.

In other embodiments, if the mobile device 102 does not yet have the media content intended for playback, mobile device 102 may wait until the media content has either finished downloading to the mobile device 102, or streaming of the media content has begun. In such embodiments, after either the media content has finished downloading or the streaming of the media content has begun, mobile device 102 might generate 304 in response to the selection input including audio, an audio output as a signal, the signal corresponding to audio data stored in the media content, from which auditory waves can be generated.

In some embodiments, if the mobile device 102 already has the media content intended for playback, mobile device 102 might generate 306 in response to the selection input including video, a video output as a signal, the signal corresponding to video data stored in the media content, from which video images can be generated. In other embodiments, if the mobile device 102 does not yet have the media content intended for playback, mobile device 102 may wait until the media content has either finished downloading to the mobile device 102, or streaming of the media content has begun. In such embodiments, after either the media content has finished downloading or the streaming of the media content has begun, mobile device 102 might generate 306 in response to the selection input including video, a video output as a signal, the signal corresponding to video data stored in the media content, from which video images can be generated.

In some embodiments, if the mobile device 102 already has the media content intended for playback, mobile device 102 might generate 308 in response to selection input including closed-captioning, a closed-captioning output as a signal, the signal corresponding to closed-captioning data stored in the media content, from which closed-captioning text can be generated. In other embodiments, if the mobile device 102 does not yet have the media content intended for playback, mobile device 102 may wait until the media content has either finished downloading to the mobile device 102, or streaming of the media content has begun. In such embodiments, after the media content has finished downloading or the streaming of the media content has begun, mobile device 102 might generate 308 in response to the selection input including closed-captioning, a closed-captioning output as a signal, the signal corresponding to closed-captioning data stored in the media content, from which closed-captioning text can be generated.

In some embodiments, the media content may be encrypted; in such embodiments, the mobile device may decrypt the media content before generating the data output(s). The mobile device may decrypt the entire media content before starting to generate the data output(s) associated with the media content, or the mobile device may decrypt the media content as the media content is streamed. The decryption may be performed by a specialized software or hardware module, such as a Trusted Execution Engine (TEE), of the mobile device.

Figure 4:
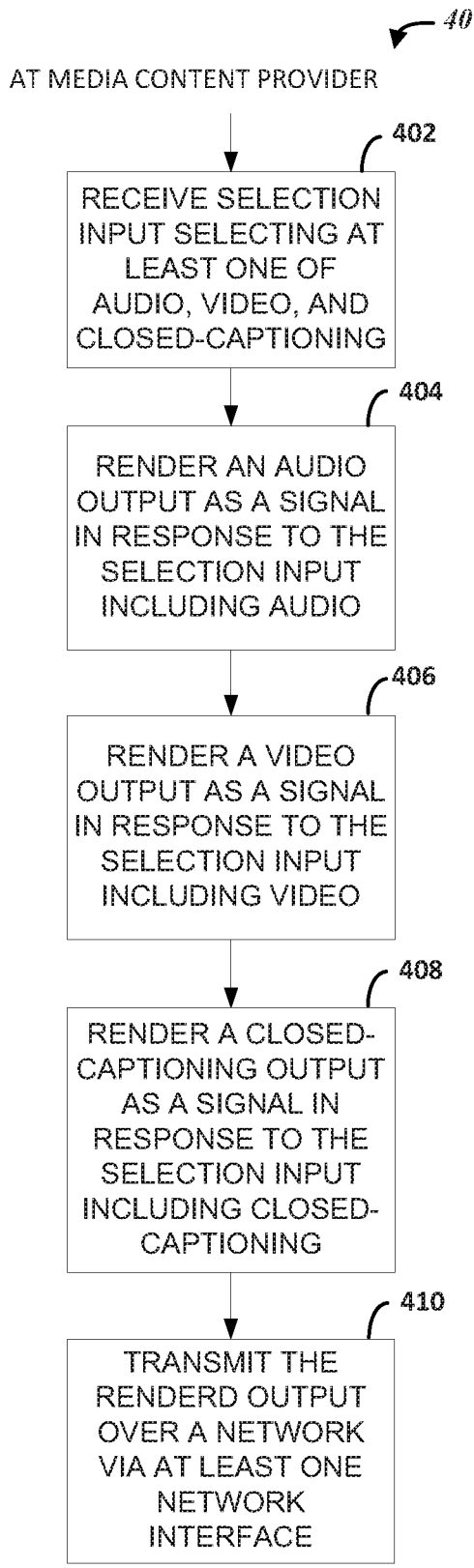
FIG. 4 illustrates a method of dynamic media content output on a media content provider in accordance with some embodiments.

FIG. 4 illustrates a method of dynamic media content output 400 on a media content provider 106, in accordance with some embodiments. In some embodiments, the media content provider 106 may be a single networked server. In other embodiments, the media content provider 106 may be a plurality of servers that communicate with each other to provide media content. In some embodiments, media content provider 106 may receive 402 selection input from a mobile device 102, the selection input selecting for playback at least one of audio, video, and closed-captioning from media content containing at least two of audio, video, and closed-captioning.

In some embodiments, media content provider 106 may generate 404, in response to the selection input including audio, an audio output as a signal, the signal corresponding to audio data stored in the media content, from which auditory waves can be generated.

In some embodiments, media content provider 106 may generate 406, in response to the selection input including video, a video output as a signal, the signal corresponding to video data stored in the media content, from which video images can be generated.

In some embodiments, media content provider 106 may generate 408, in response to selection input including closed-captioning, a closed-captioning output as a signal, the signal corresponding to closed-captioning data stored in the media content, from which closed-captioning text can be generated.

In some embodiments, media content provider 106 may adapt the media content to contain only a subset of audio data, video data, and closed-captioning data, as specified in a policy available to the media content provider. In some embodiments, the policy may include a data representation of the received selection input from a particular media content request. In some embodiments, the policy is specific to at least one intended recipient of the media content. In some embodiments, the policy may contain output mode settings for streaming events of interest within the media content. In some embodiments, the policy may contain default output mode settings based on the type of content of the media content. In some embodiments, a received selection input may be stored in the policy for use in subsequent output generation from media content.

In some embodiments, media content provider 106 may adapt media content for transmission to at least one intended recipient of the media content. In such embodiments, the adaptation may be based on the network data throughput available to a mobile device of at least one intended recipient of the media content and/or a property of a mobile device of at least one intended recipient of the media content.

In some embodiments, media content provider 106 may use a data transmission module to transmit 410 via a network interface device the generated output(s) over network 104.

Figure 5:
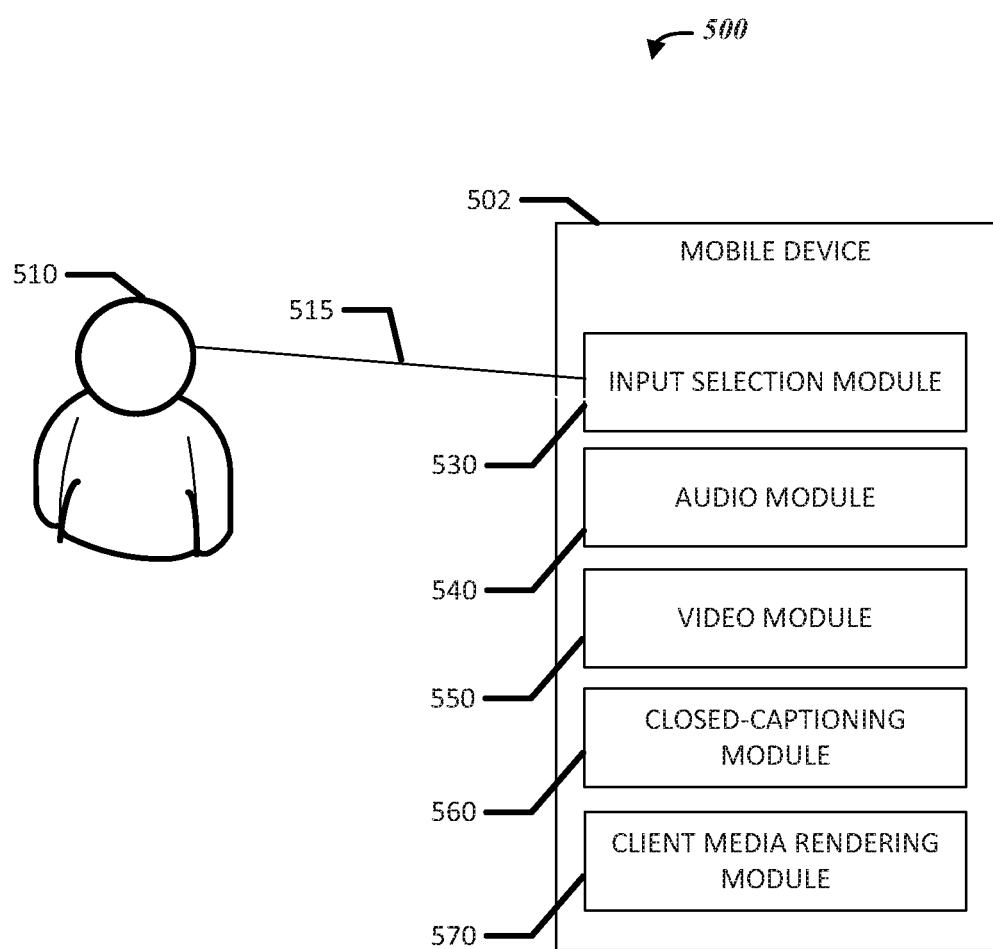
FIG. 5 illustrates a functional block diagram of an example mobile device in accordance with some embodiments.

FIG. 5 illustrates an operational environment 500 and functional block diagram of an example mobile device 502 in accordance with some embodiments. The mobile device 102, in some embodiments, includes an input selection module 530, an audio module 540, a video module 550, a closed captioning module 560, and a client media rendering module 570.

In some embodiments, a user 510 interacts 515 with the input selection module 530 of a mobile device 502 to select 515 output to be generated from media content containing at least two of audio data, video data, and closed-captioning data. The user 510 may select 515 at least one of audio, video, and closed-captioning to be output during play of the media content. For example, the user 510 may input a selection 515 to receive only video and closed-captioning from media content that contains audio, video, and closed-captioning.

In some embodiments, the audio module 540 of mobile device 102 may generate, in response to the selection input including audio, an audio output as a signal, the signal corresponding to audio data stored in the media content, from which auditory waves can be generated.

In some embodiments, the video module 550 of mobile device 102 may generate, in response to the selection input including video, a video output as a signal, the signal corresponding to video data stored in the media content, from which video images can be generated.

In some embodiments, the closed-captioning module 560 of mobile device 502 may generate, in response to the selection input including closed-captioning, a closed-captioning output as a signal, the signal corresponding to closed-captioning data stored in the media content, from which closed-captioning text can be generated.

In some embodiments, the client media rendering module 570 may aggregate the relevant outputs from the audio module 540, video module 550, and closed-captioning module 560 and generate the associated auditory waves, video images, and closed-captioning text via one or more devices included within the mobile device, such as a speaker and a display.

In some embodiments of the operational environment 550, one or more of the audio module 540, video module 550, and closed-captioning module 560 may be present as hardware or software components of one or more servers or server process accessed by the mobile device 502 via a network. In such embodiments, such as illustrated in FIG. 1, the mobile device 502 receives selection input via the input selection module 530 and transmits a data representation thereof to the server or server process. The server or server process including one or more of the audio module 540, video module 550, and closed-captioning module 560 utilizes the respective modules according the selection input and transmit the relevant media, as a single file or as a stream, to the mobile device 502. The client media rendering module 570 may then cause the received media to be presented via the mobile device 502.

Additional Notes and Examples

Example 1 may include subject matter (such as a device, apparatus, or computing device for application independent content control) comprising a mobile device comprising a selection input module for receiving, from a user, a selection input pertaining to rendering output from media content containing at least two of audio data, video data, and closed-captioning data, the selection input selecting at least one of audio, video, and closed-captioning to be output during play of the media content; an audio module for rendering an audio output as a signal in response to the selection input including audio, the signal corresponding to audio data stored in the media content and from which auditory waves can be generated; a video module for rendering a video output as a signal in response to the selection input including video, the signal corresponding to video data stored in the media content and from which video images can be generated; a closed-captioning module for rendering a closed-captioning output as a signal in response to the selection input including closed-captioning, the signal corresponding to closed-captioning data stored in the media content and from which closed-captioning text can be generated; and a client media rendering module for aggregating the relevant outputs and generating the associated auditory waves, video images, and closed-captioning text.

In Example 2, the subject matter of Example 1 may optionally include at least one network interface device, wherein the media content is streamed over a network via the at least one network interface device.

In Example 3, the subject matter of either Example 1 or 2 may optionally include adapting the media content to contain only a proper subset of audio, video, and closed-captioning data, as specified in a policy.

In Example 4, the subject matter of one or any of Examples 1-3 may optionally include adapting the media content based on at least one of a network data throughput available to the mobile device and a property of the mobile device.

In Example 5, the subject matter of one or any of Examples 1-4 may optionally include the policy being specific to a user of the mobile device.

In Example 6, the subject matter of one or any of Examples 1-5 may optionally include the policy containing output mode settings for streaming events of interest within the media content.

In Example 7, the subject matter of one or any of Examples 1-6 may optionally include the policy containing default output mode settings based on the type of content of the media content.

In Example 8, the subject matter of one or any of Examples 1-7 may optionally include the selection input being stored in the policy for use in subsequent output generation from media content.

Example 9 may include, or may optionally be combined with the subject matter of one or any of Examples 1-8 to include, subject matter (such as an apparatus, a method, a means for performing acts, or a machine readable medium including instructions that, when performed by a machine cause the machine to performs acts) comprising receiving selection input pertaining to rendering output from a media content containing at least two of audio data, video data, and closed-captioning data, the selection input selecting at least one of audio, video, and closed-captioning to be output during play of the media content; rendering, in response to the selection input including audio, an audio output as a signal, the signal corresponding to audio data stored in the media content, from which auditory waves can be generated; rendering, in response to the selection input including video, a video output as a signal, the signal corresponding to video data stored in the media content, from which video images can be generated; rendering, in response to selection input including closed-captioning, a closed-captioning output as a signal, the signal corresponding to closed-captioning data stored in the media content, from which closed-captioning text can be generated; and aggregating the relevant outputs and generating the associated waves, images, and text.

In Example 10, the subject matter of one or any of Examples 1-9 may optionally include receiving the media content as a stream of data over a network via at least one network interface device.

In Example 11, the subject matter of one or any of Examples 1-10 may optionally include adapting the media content to contain only a subset of audio, video, and closed-captioning data, as specified in a policy.

In Example 12, the subject matter of one or any of Examples 1-11 may optionally include adapting the media content based on at least one of a network data throughput available to the mobile device and a property of the mobile device.

In Example 13, the subject matter of one or any of Examples 1-12 may optionally include the policy being specific to a user of the mobile device.

In Example 14, the subject matter of one or any of Examples 1-13 may optionally include the policy containing output mode settings for streaming events of interest within the media content.

In Example 15, the subject matter of one or any of Examples 1-14 may optionally include the policy containing default output mode settings based on the type of content of the media content.

In Example 16, the subject matter of one or any of Examples 1-15 may optionally include storing the selection input in the policy for use in subsequent output generation from media content.

Example 17 may include, or may optionally be combined with the subject matter of one or any of Examples 1-16 to include, subject matter (such as a device, apparatus, or computing device for application independent content control) comprising at least one network interface device; a selection input module for receiving selection input pertaining to rendering data output from media content containing at least two of audio data, video data, and closed-captioning data, the selection input selecting at least one of audio, video, and closed-captioning to be output during play of the media content; an audio module for rendering an audio data output as a signal in response to the selection input including audio, the signal corresponding to audio data stored in the media content and from which auditory waves can be generated; a video module for rendering a video data output as a signal in response to the selection input including video, the signal corresponding to video data stored in the media content and from which video images can be generated; a closed-captioning module for rendering a closed-captioning data output as a signal in response to the selection input including closed-captioning, the signal corresponding to closed-captioning data stored in the media content and from which closed-captioning text can be generated; and a data transmission module for transmitting over a network via the at least one network interface device the rendered data output from the audio, video, and closed-captioning modules based on the selection input.

In Example 18, the subject matter of one or any of Examples 1-17 may optionally include adapting the media content to contain only a subset of audio data, video data, and closed-captioning data, as specified in a policy available to the media content provider.

In Example 19, the subject matter of one or any of Examples 1-18 may optionally include adapting the media content for transmission to at least one intended recipient, the adaption based on at least one of a network data throughput available to a mobile device of the at least one intended recipient and a property of a mobile device of the at least one intended recipient.

In Example 20, the subject matter of one or any of Examples 1-19 may optionally include the policy including a data representation of the received selection input from a particular use and the policy being specific to the at least one intended recipient.

In Example 21, the subject matter of one or any of Examples 1-20 may optionally include the policy containing output mode settings for streaming events of interest within the media content.

In Example 22, the subject matter of one or any of Examples 1-21 may optionally include the policy containing default output mode settings based on the type of content of the media content.

In Example 23, the subject matter of one or any of Examples 1-22 may optionally include the selection input being stored in the policy for use in subsequent output generation from media content.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A mobile device for use in association with a network, the mobile device comprising:
    selection input module circuitry to receive at least one user selection input related to rendering of media content containing at least two of audio data, video data, and/or closed-captioning data, the at least one user selection input indicating selection of at least one of audio, video, and/or closed-captioning to be output during playing of the media content;
    audio module circuitry to generate an audio output signal in response to the at least one user selection input indicating audio selection, the audio output signal corresponding to the audio data of the media content and being for use in auditory wave generation;
    video module circuitry to generate a video output signal in response to the at least one user selection input indicating video selection, the video output signal corresponding to the video data and being for use in video image generation;
    closed-captioning module circuitry to generate a closed-captioning output signal in response to the at least one user selection input indicating closed-captioning selection, the closed-captioning output signal corresponding to the closed-captioning data and being for use in closed-captioning text generation; and
    client media rendering circuitry to aggregate and generate auditory waves, video images, and/or closed-captioning text based upon the audio output signal, the video output signal, and/or the closed-captioning output signal.

2. The mobile device of claim 1, wherein:
    the mobile device also comprises network interface circuitry; and
    the media content is to be streamed via the network, and is to be received via the network interface circuitry.

3. The mobile device of claim 2, wherein:
    the media content is adapted to contain only a subset of the audio data, video data, and/or closed-captioning data indicated by a policy.

4. The mobile device of claim 3, wherein:
    the media content is to be adapted based upon available network data throughput and/or at least one property of the mobile device.

5. The mobile device of claim 3, wherein:
    the policy is associated with a user of the mobile device.

6. The mobile device of claim 5, wherein:
    the policy indicates output mode settings associated with event streaming.

7. The mobile device of claim 5, wherein:
the output mode settings include default settings that are based on particular media content type.

8. The mobile device of claim 5, wherein:
the policy is to include the at least one user selection input for use subsequent media content output generation.

9. At least one non-transitory machine-readable medium storing instructions to be executed by a mobile device, the media device for use in association with a network, the instructions, when executed by the mobile device, resulting in the mobile device being configured for performance of operations comprising:
receiving, via selection input module circuitry of the mobile device, at least one user selection input related to rendering of media content containing at least two of audio data, video data, and/or closed-captioning data, the at least one user selection input indicating selection of at least one of audio, video, and/or closed-captioning to be output during playing of the media content;
generating, via audio module circuitry of the mobile device, an audio output signal in response to the at least one user selection input indicating audio selection, the audio output signal corresponding to the audio data of the media content and being for use in auditory wave generation;
generating, via video module circuitry of the mobile device, a video output signal in response to the at least one user selection input indicating video selection, the video output signal corresponding to the video data and being for use in video image generation;
generating, via closed-captioning module circuitry of the mobile device, a closed-captioning output signal in response to the at least one user selection input indicating closed-captioning selection, the closed-captioning output signal corresponding to the closed-captioning data and being for use in closed-captioning text generation; and
aggregating and generating, via client media rendering circuitry of the mobile device, auditory waves, video images, and/or closed-captioning text based upon the audio output signal, the video output signal, and/or the closed-captioning output signal.

10. The at least one non-transitory machine-readable medium of claim 9, wherein:
the mobile device also comprises network interface circuitry; and
the media content is to be streamed via the network, and is to be received via the network interface circuitry.

11. The at least one non-transitory machine-readable medium of claim 10, wherein:
the media content is adapted to contain only a subset of the audio data, video data, and/or closed-captioning data indicated by a policy.

12. The at least one non-transitory machine-readable medium of claim 11, wherein:
the media content is to be adapted based upon available network data throughput and/or at least one property of the mobile device.

13. The at least one non-transitory machine-readable medium of claim 11, wherein:
the policy is associated with a user of the mobile device.

14. The at least one non-transitory machine-readable medium of claim 13, wherein:
the policy indicates output mode settings associated with event streaming.

15. The at least one non-transitory machine-readable medium of claim 13, wherein:
the output mode settings include default settings that are based on particular media content type.

16. The at least one non-transitory machine-readable medium of claim 13, wherein:
the policy is to include the at least one user selection input for use subsequent media content output generation.

17. Media content provider server system for use in association with a mobile device and a network, the media content provider server system comprising:
network interface circuitry;
processor circuitry;
machine-readable memory storing instructions for execution by the processor circuitry, the instructions when executed by the processor circuitry resulting in the media content provider server system being configured for performance of operations comprising:
receiving, via the network, at least one media content request generated based upon at least one selection input related to rendering of media content containing at least two of audio data, video data, and/or closed-captioning data, the at least one selection input indicating selection of at least one of audio, video, and/or closed-captioning to be output during playing of the media content;
adapting the media content based upon the at least one media content request so as to conform to the at least one selection input; and
transmitting the adapted media content via network interface circuitry and the network;
wherein:
the at least one selection input is to be received by the mobile device;
in response to the at least one selection input indicating audio selection, audio module circuitry of the mobile device is to generate an audio output signal corresponding to the audio data and being for use in auditory wave generation;
in response to the at least one selection input indicating video selection, video module circuitry of the mobile device is to generate a video output signal corresponding to the video data and being for use in video image generation;
in response to the at least one selection input indicating closed-captioning selection, closed-captioning module circuitry of the mobile device is to generate a closed-captioning output signal corresponding to the closed-captioning data and being for use in closed-captioning text generation; and
client media rendering circuitry of the media device is to aggregate and generate auditory waves, video images, and/or closed-captioning text based upon the audio output signal, the video output signal, and/or the closed-captioning output signal.

18. The media content provider server system of claim 17, wherein:
the media content is to be streamed via the network, and is to be received via the network interface circuitry.

19. The media content provider server system of claim 18, wherein:
as transmitted from the media content provider server system, the adapted media content contains only a subset of the audio data, video data, and/or closed-captioning data indicated by a policy.

20. The media content provider server system of claim 19, wherein:
as transmitted from the media content provider server system, the adapted media content is adapted based upon available network data throughput and/or at least one property of the mobile device.

21. The media content provider server system of claim 19, wherein:
the policy is associated with a user of the mobile device.

22. The media content provider server system of claim 21, wherein:
the policy indicates output mode settings associated with event streaming.

23. The media content provider server system of claim 21, wherein:
the output mode settings include default settings that are based on particular media content type.

24. The media content provider server system of claim 21, wherein:
the policy is to include the at least one selection input for use subsequent media content output generation.

\* \* \* \* \*